United States Patent
Lee

(10) Patent No.: US 12,326,183 B2
(45) Date of Patent: Jun. 10, 2025

(54) LOCK-UP CLUTCH HAVING RADIAL COOLING CHANNEL AND TORQUE CONVERTER USING THE SAME

(71) Applicant: VALEO KAPEC CO., LTD., Daegu (KR)

(72) Inventor: Jung-Ho Lee, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 18/395,859

(22) Filed: Dec. 26, 2023

(65) Prior Publication Data
US 2024/0218920 A1    Jul. 4, 2024

(30) Foreign Application Priority Data

Dec. 30, 2022    (KR) .................... 10-2022-0191230

(51) Int. Cl.
*F16H 45/02*    (2006.01)
*F16D 13/74*    (2006.01)

(52) U.S. Cl.
CPC ..... *F16H 45/02* (2013.01); *F16H 2045/0284* (2013.01); *F16H 2045/0289* (2013.01)

(58) Field of Classification Search
CPC ............. F16H 45/02; F16H 2045/0284; F16H 2045/0289; F16H 41/30; F16H 41/24; F16D 25/12; F16D 25/0638; F16D 13/72–74
See application file for complete search history.

(56) References Cited

U.S. PATENT DOCUMENTS

| | | | | |
|---|---|---|---|---|
| 7,650,977 | B2 * | 1/2010 | Suzuki | F16D 13/648 192/113.36 |
| 2002/0033310 | A1 * | 3/2002 | Sasse | F16H 45/02 192/3.29 |
| 2010/0044179 | A1 * | 2/2010 | Nakamura | F16D 25/0638 192/58.2 |
| 2016/0215830 | A1 * | 7/2016 | Hattori | F16D 25/0638 |
| 2019/0120360 | A1 * | 4/2019 | Sung | F16D 13/52 |

FOREIGN PATENT DOCUMENTS

| | | | | |
|---|---|---|---|---|
| JP | 2011-127687 A | | 6/2011 | |
| KR | 20140072379 A | * | 6/2014 | ............. F16H 41/24 |
| KR | 10-2022-0097214 A | | 7/2022 | |
| WO | WO-2019045157 A1 | * | 3/2019 | ............. F16H 45/02 |

OTHER PUBLICATIONS

Office Action issued Jun. 20, 2024, in corresponding Korean Patent Application No. 10-2022-0191230, 5 pages.

* cited by examiner

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

The present invention provides a lock-up clutch for a torque converter. The lock-up clutch includes an outer carrier, an inner carrier, a first friction plate, a rotation of which is restricted by the outer carrier, and a second friction plate, a rotation of which is restricted by the inner carrier. All key grooves of the outer and inner carriers are opened in two radial opposite directions, and flow path grooves defined between friction members attached to the friction plate are aligned with circumferential positions of keys of the friction plate. Therefore, oil for cooling a clutch pack may smoothly flow through the inner carrier, the flow path grooves, and the outer carrier.

13 Claims, 15 Drawing Sheets

LOCK-UP CLUTCH HAVING RADIAL COOLING CHANNEL AND TORQUE CONVERTER USING THE SAME

CROSS-REFERENCE TO RELATED APPLICATIONS

This application claims priority to and the benefit of Korean Patent Application No. 10-2022-0191230 filed in the Korean Intellectual Property Office on Dec. 30, 2022, the entire contents of which are incorporated herein by reference.

TECHNICAL FIELD

The present invention relates to a lock-up clutch equipped with a wet clutch pack and a torque converter for a vehicle having the same, and more particularly, to a torque converter including a lock-up clutch structure, which has a channel through which a fluid smoothly flows in a centrifugal direction in order to smoothly cool a wet clutch pack, and a fluid supply structure capable of smoothly supplying a cooling fluid to the clutch pack of the lock-up clutch.

BACKGROUND ART

In general, a torque converter may be installed between an engine and a transmission of a vehicle and serve to transmit driving power of the engine to the transmission by using a fluid. The torque converter may be a fluid power transmission mechanism that is a constituent element of an automatic transmission and serves to boost up driving power provided by the engine and transmit the driving power to the transmission.

With reference to FIG. 1, a torque converter 10 includes a torus 30 configured to transmit a rotational force, which is inputted from the engine, to an output member 60 by means of a fluid coupling through a cover 20 including a front cover 21 and a rear cover 22. The torus 30 includes an impeller 31 provided in the front cover 21, a turbine 32 provided on a turbine plate 33 fixed to the output member 60, and a reactor 34 supported by a fixed end 36 by means of a one-way clutch 35. Because of a difference in relative rotational speed caused by the fluid coupling, a first bearing B1 and a second bearing B2 are respectively installed between the impeller 31 and the reactor 34 and between the reactor 34 and the turbine 32. The torque converter 10 has a structure that transmits power by using a force of a fluid (automatic transmission fluid (ATF)), which inevitably causes a slip and a loss of power.

A lock-up clutch 50 is applied to the torque converter 10 to solve the above-mentioned problem and improve power transmission efficiency. In order to compensate for a loss of power transmission caused by the fluid coupling, the lock-up clutch is disposed in parallel with a fluid clutch in a power transmission system and directly connects an input and an output through a route independent of the fluid clutch.

In addition, the torque converter additionally includes a structure of a torsional damper 40 capable of mitigating an impact when the lock-up clutch 50 is directly engaged. The torsional damper 40 is disposed between the lock-up clutch 50 and the output member 60 in the power transmission system and transmits an input of the engine, which is received through a damper input member 41, to a damper output member 42 through an elastic body 43, thereby absorbing fluctuation in input torque.

The lock-up clutches applied to the torque converters are classified into a single-facing type lock-up clutch to which a single friction plate including a friction member is applied, and a multi-facing type lock-up clutch in which two or more friction plates constitute a clutch pack.

The clutch pack 52 is interposed between an outer carrier 51 and an inner carrier 55 respectively connected to an input side including the cover 20 and an output side including the output member 60. The clutch pack 52 has a structure in which an axially slidable first friction plate 521 and an axially slidable second friction plate 525 are alternately disposed in an axial direction. A rotation of the first friction plate 521 is restricted by the outer carrier 51, and a rotation of the second friction plate 525 is restricted by the inner carrier 55. When a hydraulic pressure in an operation pressure area A2 of an operation chamber 54 defined by a piston 53 is higher than a hydraulic pressure in a circulation pressure area A1, the clutch pack 52 is axially pressed by the piston 53 and restricts the rotation of the outer carrier 51 and the rotation of the inner carrier 55.

A frictional force of the clutch pack 52 may be decreased by heat generated by friction. In addition, a lifespan of the friction member may be decreased by the heat. Typically, the clutch pack 52 of the torque converter is disposed in the circulation pressure area A1 in which oil circulates for the fluid coupling of the torus 30, and the clutch pack 52 may be cooled by the oil.

With reference to FIG. 2, a first friction member 523 of the first friction plate 521 of the clutch pack 52 and a second friction member 527 of the second friction plate 525 may be cooled by oil supplied from the automatic transmission and introduced through an oil hole 67. The oil introduced through the oil hole 67 flows in a centrifugal direction by a centrifugal force. In this case, the oil cools the clutch pack 52 while flowing around the clutch pack 52.

In this case, the outer carrier 51 having a drum shape illustrated in FIG. 2 has a shape that blocks a radially outer space of the clutch pack 52, and thus the outer carrier 51 blocks a flow of oil flowing radially outward by receiving a centrifugal force. In addition, flow resistance is high because a gap between the adjacent friction plates is very narrow. For this reason, the oil detours around the clutch pack 52 without smoothly flowing through a space between the friction plates.

In order to mitigate the above-mentioned situation, a hole through which the oil may pass is formed in the drum-shaped portion of the carrier. However, the above-mentioned configuration is still insufficient to ensure a flow of oil for cooling the friction member.

SUMMARY OF THE INVENTION

The present invention has been made in an effort to solve the above-mentioned problem, and an object of the present invention is to provide a lock-up clutch structure capable of ensuring an effect of cooling a clutch pack by allowing oil to smoothly flow between friction plates provided in the clutch pack.

The present invention has also been made in an effort to provide a clutch pack structure corresponding to the lock-up clutch structure and configured to enable oil to smoothly flow between the friction plates.

The present invention has also been made in an effort to provide a torque converter structure capable of providing a smooth flow of oil to the lock-up clutch structure.

The technical objects of the present invention are not limited to the above-mentioned objects, and other objects and advantages of the present invention, which are not mentioned above, may be understood from the following descriptions and more clearly understood from the embodiment of the present invention. In addition, it can be easily understood that the objects and advantages of the present invention may be realized by means defined in the claims and a combination thereof.

The present invention for achieving the above-mentioned object may be applied to a lock-up clutch of a torque converter that transmits a rotational force, which is received from an input member, to an output member.

The input member may receive a rotational force of an engine from an axially front side.

The output member may transmit the rotational force axially rearward to a transmission.

The torque converter may connect the input member and the output member by means of a fluid coupling.

To this end, the torque converter may include a cover that defines an internal space that may be filled with a fluid. The cover constitutes the input member configured to receive the rotational power from the engine, and the output member may be provided in the form of a hub and disposed in the cover.

A fixed end connected to the transmission may be provided in the cover, and a torus configured to connect the input member and the output member by means of the fluid coupling may be provided in the cover.

The torus may include an impeller connected to the input member, a turbine connected to the output member and configured to face the impeller in the axial direction, and a reactor connected to the fixed end and disposed between the impeller and the turbine.

The impeller may be installed on an inner wall of the cover and rotate together with the cover.

The turbine may be installed on a turbine plate connected to the output member and rotate together with the output member.

The reactor may be connected to the fixed end through a one-way clutch. The reactor may be supported by the fixed end so that the reactor rotates in a direction identical to the rotation direction of the impeller and the turbine, and the reactor does not rotate in a direction opposite to the rotation direction of the impeller and the turbine.

The lock-up clutch of the torque converter may be disposed in parallel with the torus in the power transmission system.

The lock-up clutch may include an outer carrier connected to any one of the input and output members so that a rotation thereof is restricted, an inner carrier connected to the other of the input and output members so that a rotation thereof is restricted, the inner carrier being disposed radially inward of the outer carrier, and a clutch pack provided between the outer and inner carriers in a radial direction.

The clutch pack may include a first friction plate connected to the outer carrier so that a rotation thereof is restricted, and a second friction plate connected to the inner carrier so that a rotation thereof is restricted.

The first friction plate and the second friction plate may be alternately disposed in the axial direction.

A piston may be installed forward or rearward of the clutch pack and configured to press or release the clutch pack in the axial direction.

When the piston presses the clutch pack in the axial direction, the input member and the output member are coupled by the lock-up clutch. When the piston releases the clutch pack in the axial direction, the input member and the output member may be decoupled from the lock-up clutch.

The outer carrier may include a first annular member connected to any one of the input and output members so that a rotation thereof is restricted.

The outer carrier includes a plurality of first axial keys disposed to be spaced apart from one another in a circumferential direction and extending in the axial direction, and a plurality of first key grooves each provided between the two first axial keys adjacent to each other in the circumferential direction and all opened in centripetal and centrifugal directions.

Therefore, in a section G1 in which the first key grooves are disposed in the axial direction, the fluid may flow in the radial direction while passing through the first key grooves.

The first axial key may extend in the axial direction from the first annular member.

The inner carrier may include a second annular member connected to the other of the input and output members so that a rotation thereof is restricted.

The inner carrier includes a plurality of second axial keys disposed to be spaced apart from one another in the circumferential direction of the second annular member and extending in the axial direction of the second annular member, and a plurality of second key grooves each provided between the two second axial keys adjacent to each other in the circumferential direction and all opened in the centripetal and centrifugal directions.

Therefore, in a section G2 in which the second key grooves are disposed in the axial direction, the fluid may flow in the radial direction while passing through the second key grooves.

The second axial key may extend in the axial direction from the second annular member.

The first friction plate may have an annular flat plate shape.

The first friction plate may include a plurality of centrifugal keys disposed to be spaced apart from one another in the circumferential direction of the first friction plate, extending in the centrifugal direction from an outer peripheral surface of the first friction plate, and inserted into the first key groove, and a plurality of first friction members provided on an axial surface of the first friction plate and disposed to be spaced apart from one another in the circumferential direction.

First flow path grooves are each provided between the two first friction members adjacent to each other in the circumferential direction and all opened in the centripetal and centrifugal directions.

The second friction plate may have an annular flat plate shape.

The second friction plate may include a plurality of centripetal keys disposed to be spaced apart from one another in the circumferential direction of the second friction plate, extending in the centripetal direction from an inner peripheral surface of the second friction plate, and inserted into the second key groove, and a plurality of second friction members provided on an axial surface of the second friction plate and disposed to be spaced apart from one another in the circumferential direction.

A plurality of second flow path grooves is each provided between the two second friction members adjacent to each other in the circumferential direction and all opened in the centripetal and centrifugal directions.

In the clutch pack, sections M1, in which the first friction members are disposed in the axial direction, and sections M2, in which the second friction members are disposed in the axial direction, may be disposed alternately to be spaced apart from one another in the axial direction.

Further, all or at least some of the first friction member axial sections and the second friction member axial sections are disposed in the first key groove axial section and the second key groove axial section.

Therefore, the second key grooves of the inner carrier, the first and second flow path grooves of the clutch pack, and the first key grooves of the outer carrier may be disposed on an imaginary plane that is perpendicular to the axial direction and extends in the radial direction.

Then, the fluid, which flows in the centrifugal direction by receiving a centrifugal force generated by the rotation of the cover, may smoothly flow while passing through the second key grooves of the inner carrier, the first flow path grooves and the second flow path grooves of the clutch pack, and the first key grooves of the outer carrier.

In addition, an inner diameter RiP1 of the first friction plate and an inner diameter RiP2 of the second friction plate may be larger than an outer diameter R2 of the second axial key. Therefore, predetermined gaps may be provided in the radial direction between the second axial keys, the first friction plate, and the second friction plate.

Therefore, the fluid, which flows in the centrifugal direction through the second key grooves of the inner carrier, may be smoothly distributed in the axial direction through the gaps, such that the fluid may be introduced into the first flow path grooves and the second flow path grooves of the clutch pack.

In addition, an outer diameter RoP1 of the first friction plate and an outer diameter RoP2 of the second friction plate may be smaller than an inner diameter R1 of the first axial key. Therefore, predetermined gaps may be provided in the radial direction between the first friction plate, the second friction plate, and the second axial keys.

Therefore, the fluid, which flows in the centrifugal direction through the first flow path grooves and the second flow path grooves of the clutch pack, may be smoothly distributed in the axial direction through the gaps, such that the fluid may be discharged in the centrifugal direction through the first key grooves of the outer carrier.

Because the centripetal keys of the second friction plate penetrate the second key grooves of the inner carrier, the rotation of the second friction plate and the rotation of the inner carrier are restricted relative to each other. Therefore, the circumferential positions of the second flow path grooves of the second friction plate with respect to the second key grooves of the inner carrier are not changed even though the inner carrier and the second friction plate are rotated.

Therefore, when the circumferential positions of the second flow path grooves of the second friction plate are aligned with the circumferential positions of the second key grooves so that the second key grooves face the second flow path grooves in the radial direction, the fluid, which flows in the centrifugal direction through the second key grooves, may immediately flow into the second flow path grooves without detouring in the circumferential direction.

For example, all the second flow path grooves may respectively face the second key grooves in the radial direction. Because the second key grooves are opened in the radial direction, the fluid, which is introduced in the centrifugal direction through the second key grooves, may be introduced into the second flow path grooves, which face the second key grooves in the radial direction, without detouring in the circumferential direction.

For example, all the second flow path grooves may respectively face the centripetal keys in the radial direction. Because the centripetal key is fitted into the second key groove, the second key groove is positioned at the circumferential position at which the centripetal key is provided. Therefore, when the second flow path groove faces the centripetal key in the radial direction, the second flow path groove also faces the second key groove. Therefore, the fluid, which is introduced into the centrifugal direction through the second key grooves into which the centripetal keys are inserted, may be introduced into the second flow path grooves, which face the centripetal keys in the radial direction, without detouring in the circumferential direction.

For example, all the centripetal keys may respectively face the second flow path grooves in the radial direction. Because the second key grooves are positioned at the circumferential positions at which the centripetal keys are provided, the fluid, which is introduced in the centrifugal direction through the second key grooves into which the centripetal keys are inserted, may be introduced into the second flow path grooves, which face the centripetal keys in the radial direction, without detouring in the circumferential direction.

For example, all the second key grooves respectively face the second flow path grooves in the radial direction. Then, the fluid, which is introduced in the centrifugal direction through the second key grooves, may be introduced into the second flow path grooves, which face the second key grooves in the radial direction, without detouring in the circumferential direction.

The above-mentioned second flow path grooves may be disposed at equal intervals in the circumferential direction. Likewise, the second key grooves may be disposed at equal intervals in the circumferential direction, and the centripetal keys may also be disposed at equal intervals in the circumferential direction.

For example, a circumferential interval between the second flow path grooves may correspond to a circumferential interval between the second key grooves.

In another example, a circumferential interval between the second flow path grooves may be different from a circumferential interval between the second key grooves. In this case, any one of the number of second flow path grooves and the number of second key grooves may be made by multiplying the other by a natural number. For example, the number of second flow path grooves may be two or four times the number of second key grooves. Therefore, the circumferential interval between the second flow path grooves may also be an integer multiple of the circumferential interval between the second key grooves.

Then, all the components, which are small in number among the second flow path grooves and the second key grooves, may be aligned with the other components in the circumferential direction and face the other components in the radial direction. For example, in case that the second flow path grooves are larger in number, all the second key grooves may be disposed to face the second flow path grooves in the radial direction. On the contrary, in case that the second key grooves are larger in number, all the second flow path grooves may face the second key grooves. In any case, this arrangement may be a circumferential arrangement that allows the fluid to flow most smoothly in the lock-up clutch having the corresponding number of second flow path grooves and the corresponding number of second key grooves.

For example, a circumferential interval between the second flow path grooves may correspond to a circumferential interval between the centripetal keys.

In another example, a circumferential interval between the second flow path grooves may be different from a circumferential interval between the centripetal keys. In this case, any one of the number of second flow path grooves and the number of centripetal keys may be made by multiplying the other by a natural number. For example, the number of second flow path grooves may be two or four times the number of centripetal keys. Therefore, the circumferential interval between the second flow path grooves may also be an integer multiple of the circumferential interval between the centripetal keys.

Then, all the components, which are small in number among the second flow path grooves and the centripetal keys, may be aligned with the other components in the circumferential direction and face the other components in the radial direction. For example, in case that the second flow path grooves are larger in number, all the second key grooves into which all the centripetal keys are inserted may be disposed to face the second flow path grooves in the radial direction. On the contrary, in case that the centripetal keys are larger in number, all the second flow path grooves may face the second key grooves into which the centripetal keys are fitted. In any case, this arrangement may be a circumferential arrangement that allows the fluid to flow most smoothly in the lock-up clutch having the corresponding number of second flow path grooves and the corresponding number of centripetal keys.

For example, a circumferential interval between the second key grooves may correspond to a circumferential interval between the centripetal keys.

In another example, a circumferential interval between the second key grooves may be different from a circumferential interval between the centripetal keys. In this case, any one of the number of key grooves and the number of centripetal keys may be made by multiplying the other by a natural number. Therefore, the circumferential interval between the second flow path grooves may also be an integer multiple of the circumferential interval between the second key grooves.

In case that the second key grooves are larger in number, the centripetal keys may be inserted into some of the second key grooves. In case that the centripetal keys are larger in number, the two or more centripetal keys may be inserted into the single second key groove. Even in this shape, the fluid may smoothly flow when the second flow path grooves may be aligned with the centripetal keys or aligned with the second key grooves.

Next, because the centrifugal keys of the first friction plate penetrate the first key grooves of the outer carrier, the rotation of the first friction plate and the rotation of the outer carrier are restricted relative to each other. Therefore, the circumferential positions of the first flow path grooves of the first friction plate with respect to the first key grooves of the outer carrier are not changed even though the outer carrier and the first friction plate are rotated.

Therefore, when the circumferential positions of the first flow path grooves of the first friction plate are aligned with the circumferential positions of the first key grooves so that the first key grooves face the first flow path grooves in the radial direction, the fluid, which flows in the centrifugal direction through the first flow path grooves, may be immediately discharged in the centrifugal direction through the first key grooves without detouring in the circumferential direction.

For example, all the first flow path grooves may respectively face the first key grooves in the radial direction. Because the first key grooves are opened in the radial direction, the fluid, which flows in the centrifugal direction through the first flow path grooves, may be discharged in the centrifugal direction of the lock-up clutch through the first key grooves, which face the first flow path grooves in the radial direction, without detouring in the circumferential direction.

For example, all the first flow path grooves may respectively face the centrifugal keys in the radial direction. Because the centrifugal key is fitted into the first key groove, the first key groove is positioned at the circumferential position at which the centrifugal key is provided. Therefore, when the first flow path groove faces the centrifugal key in the radial direction, the first flow path groove also faces the first key groove. Therefore, the fluid, which flows in the centrifugal direction through the first flow path grooves, may be discharged in the centrifugal direction through the first key grooves, which face the first flow path grooves in the radial direction, without detouring in the circumferential direction.

For example, all the centrifugal keys may respectively face the first flow path grooves in the radial direction. Because the first key grooves are positioned at the circumferential position at which the centrifugal keys are provided, the fluid, which flows in the centrifugal direction through the first flow path grooves, may be discharged in the centrifugal direction through the first key grooves, into which the centrifugal keys, which face the first flow path grooves in the radial direction, are inserted, without detouring in the circumferential direction.

For example, all the first key grooves may respectively face the first flow path grooves in the radial direction. Then, the fluid, which flows in the centrifugal direction through the first flow path grooves, may be discharged in the centrifugal direction through the first key grooves, which face the first flow path grooves in the radial direction, without detouring in the circumferential direction.

The above-mentioned first flow path grooves may be disposed at equal intervals in the circumferential direction. Likewise, the first key grooves may be disposed at equal intervals in the circumferential direction, and the centrifugal keys may also be disposed at equal intervals in the circumferential direction.

For example, a circumferential interval between the first flow path grooves may correspond to a circumferential interval between the first key grooves.

In another example, a circumferential interval between the first flow path grooves may be different from a circumferential interval between the first key grooves. In this case, any one of the number of first flow path grooves and the number of first key grooves may be made by multiplying the other by a natural number. For example, the number of first flow path grooves may be two or four times the number of first key grooves. Therefore, the circumferential interval between the first flow path grooves may also be an integer multiple of the circumferential interval between the first key grooves.

Then, all the components, which are small in number among the first flow path grooves and the first key grooves, may be aligned with the other components in the circumferential direction and face the other components in the radial direction. For example, in case that the first flow path grooves are larger in number, all the first key grooves may be disposed to face the first flow path grooves in the radial direction. On the contrary, in case that the first key grooves are larger in number, all the first flow path grooves may face the first key grooves. In any case, this arrangement may be a circumferential arrangement that allows the fluid to flow most smoothly in the lock-up clutch having the corresponding number of first flow path grooves and the corresponding number of first key grooves.

For example, a circumferential interval between the first flow path grooves may correspond to a circumferential interval between the centrifugal keys.

In another example, a circumferential interval between the first flow path grooves may be different from a circumferential interval between the centrifugal keys. In this case, any one of the number of first flow path grooves and the number of centrifugal keys may be made by multiplying the other by a natural number. For example, the number of first flow path grooves may be two or four times the number of centrifugal keys. Therefore, the circumferential interval between the first flow path grooves may also be an integer multiple of the circumferential interval between the centrifugal keys.

Then, all the components, which are small in number among the first flow path grooves and the centrifugal keys, may be aligned with the other components in the circumferential direction and face the other components in the radial direction. For example, in case that the first flow path grooves are larger in number, all the first key grooves into which all the centrifugal keys are inserted may be disposed to face the first flow path grooves in the radial direction. On the contrary, in case that the centrifugal keys are larger in number, all the first flow path grooves may face the first key grooves into which the centrifugal keys are fitted. In any case, this arrangement may be a circumferential arrangement that allows the fluid to flow most smoothly in the lock-up clutch having the corresponding number of first flow path grooves and the corresponding number of centrifugal keys.

For example, a circumferential interval between the first key grooves may correspond to a circumferential interval between the centrifugal keys.

In another example, a circumferential interval between the first key grooves may be different from a circumferential interval between the centrifugal keys. In this case, any one of the number of first key grooves and the number of centrifugal keys may be made by multiplying the other by a natural number. Therefore, the circumferential interval between the first flow path grooves may also be an integer multiple of the circumferential interval between the first key grooves.

In case that the first key grooves are larger in number, the centrifugal keys may be inserted into some of the first key grooves. In case that the centrifugal keys are larger in number, the two or more centrifugal keys may be inserted into the single first key groove. Even in this shape, the fluid may smoothly flow when the first flow path grooves may be aligned with the centrifugal keys or aligned with the first key grooves.

Meanwhile, sizes of the torque converter equipped with the clutch pack may be variously set but do not greatly deviate from typically used sizes. Because the first axial keys of the outer race and the second axial keys of the inner races are bent in the axial direction from the first and second annular members having annular flat plate shapes, an appropriate circumferential dimension is present.

In addition, the first and second friction members also have appropriate circumferential dimension ranges in terms of design.

Therefore, as described above, for example, a large greatest common divisor of six or more is present between the number of second flow path grooves and the number of first key grooves when the second flow path grooves of the second friction plate are disposed at equal intervals in the circumferential direction and the first key grooves of the outer carrier are disposed at equal intervals in the circumferential direction.

Likewise, for example, a large greatest common divisor of six or more is present between the number of first flow path grooves and the number of second key grooves when the second key grooves of the inner carrier are disposed at equal intervals in the circumferential direction and the first flow path grooves of the first friction plate are disposed at equal intervals in the circumferential direction.

The outer carrier and the inner carrier may rotate relative to each other. However, during the coupling operation of the lock-up clutch, the outer carrier and the inner carrier are integrally rotated as the clutch pack is pressed by the piston. Therefore, the circumferential positions of the first flow path grooves of the first friction plate with respect to the second key grooves of the inner carrier vary each time the outer carrier and the inner carrier are coupled. Likewise, the circumferential positions of the second flow path grooves of the second friction plate with respect to the first key grooves of the outer carrier also vary each time the outer carrier and the inner carrier are coupled.

In this case, as described above, when the large greatest common divisor is present between the number of first key grooves and the number of second flow path grooves and the large greatest common divisor is present between the number of second key grooves and the number of first flow path grooves, the points at which the first key grooves and the second flow path grooves face one another in the radial direction are present by the number of greatest common divisors therebetween, and the points are disposed at equal intervals in the circumferential direction. Further, the points at which the first key grooves face the second flow path grooves in the radial direction are also present by the number of greatest common divisors therebetween, and the points are also disposed at equal intervals in the circumferential direction.

Then, when the fluid flowing in the centrifugal direction is introduced into the first flow path grooves through the second key grooves of the inner carrier, the fluid is more smoothly introduced into the first flow path grooves facing the second key grooves in the radial direction. When the points are disposed at equal intervals by the number of greatest common divisors, the flow of the fluid introduced into the clutch pack through the second key grooves is balanced in the circumferential direction of the lock-up clutch, such that there occurs no problem such as vibration caused by an imbalanced flow of the fluid.

Likewise, the fluid, which flows in the centrifugal direction through the second flow path grooves, is more smoothly introduced into the first key grooves facing the second flow path grooves in the radial direction. When the points are disposed at equal intervals by the number of greatest common divisors, the flow of the fluid discharged radially outward from the clutch pack through the second flow path grooves is balanced in the circumferential direction of the lock-up clutch, such that there occurs no problem such as vibration caused by an imbalanced flow of the fluid.

The present invention provides a torque converter including the input member, the torus, the lock-up clutch, and the output member.

For example, the torque converter may include a piston disposed rearward of the clutch pack and configured to press the clutch pack forward, and a hub oil hole provided in the input member and configured as a passageway through which oil is supplied to a space closer to a centripetal side than the inner carrier, that is, a space disposed forward of the piston.

In this case, the inner carrier may be connected to a side of the input member, and the outer carrier may be connected to a side of the output member.

In another example, the torque converter may include a piston disposed forward of the clutch pack and configured to press the clutch pack rearward, and an oil hole provided in the output member and configured as a passageway through which oil is supplied to a space closer to a centripetal side than the inner carrier, that is, a space disposed rearward of the piston.

In this case, the inner carrier may be connected to a side of the output member, and the outer carrier may be connected to a side of the input member.

The torque converter may further include a torsional damper disposed between the lock-up clutch and the output member and configured to connect the lock-up clutch and the output member.

The torsional damper may be a single type or a double serial type.

In addition, a pendulum may be further installed at a side of the output member.

According to the lock-up clutch structure of the present invention, the friction members provided in the clutch pack are disposed in the axial sections of the second key grooves of the inner carrier and the first key grooves of the outer carrier opened in the radial direction, such that the oil may smoothly flow between the friction plates in the clutch pack, which may ensure an effect of cooling the clutch pack.

According to the lock-up clutch structure of the present invention, the second key grooves of the inner carrier and the first key grooves of the outer carrier are aligned with the second flow path grooves of the second friction plate and the first flow path grooves of the first friction plate in the circumferential direction and face the second flow path grooves of the second friction plate and the first flow path grooves of the first friction plate in the radial direction, such that the fluid may smoothly flow into the clutch pack from the inner carrier, and the fluid may smoothly flow out to the outer carrier from the clutch pack.

According to the lock-up clutch structure of the present invention, the second key grooves of the inner carrier and the first key grooves of the outer carrier are aligned with the first flow path grooves of the first friction plate and the second flow path grooves of the second friction plate at equal intervals in the circumferential direction at the corresponding positions, such that the fluid may smoothly flow into the clutch pack from the inner carrier, and the fluid may smoothly flow out to the outer carrier from the clutch pack.

The torque converter of the present invention may effectively cool the friction members of the lock-up clutch by smoothly supplying the fluid into the radial internal space of the inner carrier.

The specific effects of the present invention, together with the above-mentioned effects, will be described along with the description of specific items for carrying out the present invention.

DETAILED DESCRIPTION

Figure 1:
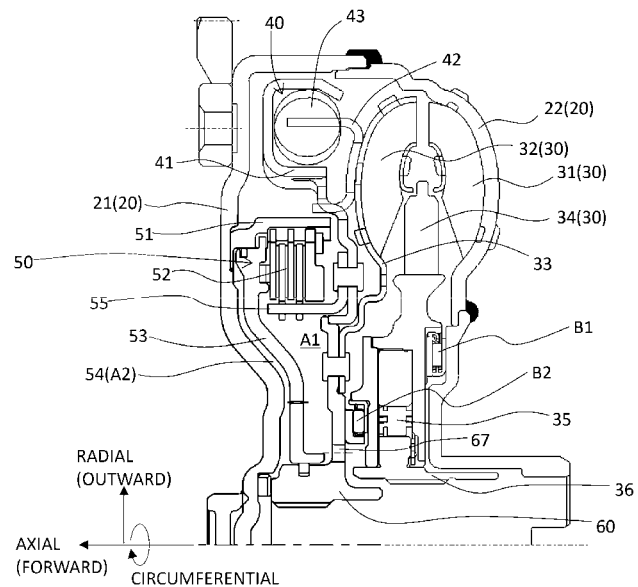
FIG. 1 is a view schematically illustrating a torque converter for a vehicle of a first example.
Figure 2:
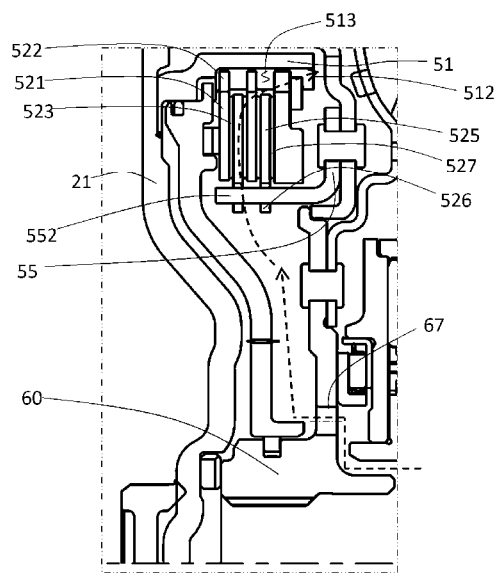
FIG. 2 is an enlarged view of a part of a lock-up clutch of the torque converter in FIG. 1.

Hereinafter, exemplary embodiments of the present invention will be described in detail with reference to the accompanying drawings. In the drawings, the same reference numerals are used to indicate the same or similar constituent elements. The above-mentioned objects, features, and advantages will be described in detail below with reference to the accompanying drawings, and thus the technical spirit of the present invention will be easily carried out by those skilled in the art to which the present invention pertains. In the description of the present invention, the specific descriptions of publicly known technologies related with the present invention will be omitted when it is determined that the specific descriptions may unnecessarily obscure the subject matter of the present invention.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element. Therefore, unless explicitly described to the contrary, the first constituent element may, of course, be the second constituent element.

Throughout the specification, unless explicitly described to the contrary, the respective constituent elements may each be singular or plural.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Throughout the specification, "A and/or B" means A, B, or A and B unless explicitly described to the contrary, and "C to D" means C or more and D or less unless explicitly described to the contrary.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a torque converter according to an embodiment is symmetrical with respect to an axis, only the half of the torque converter based on the axis is illustrated for the convenience of illustration. In addition, for the convenience of description, a direction along a length direction of an axis defining a center of a rotation of the torque converter is defined as an axial direction. That is, a forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing rearward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

Hereinafter, a torque converter 10 for a vehicle according to an embodiment of the present invention and a lock-up clutch 50 provided in the torque converter 10 will be described.

Figure 3:
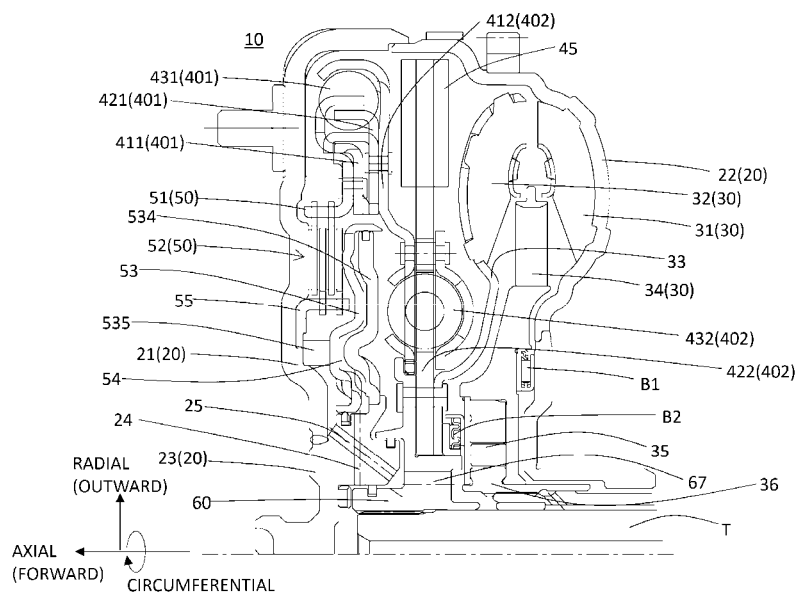
FIG. 3 is a view schematically illustrating a torque converter for a vehicle of a second example.
Figure 4:
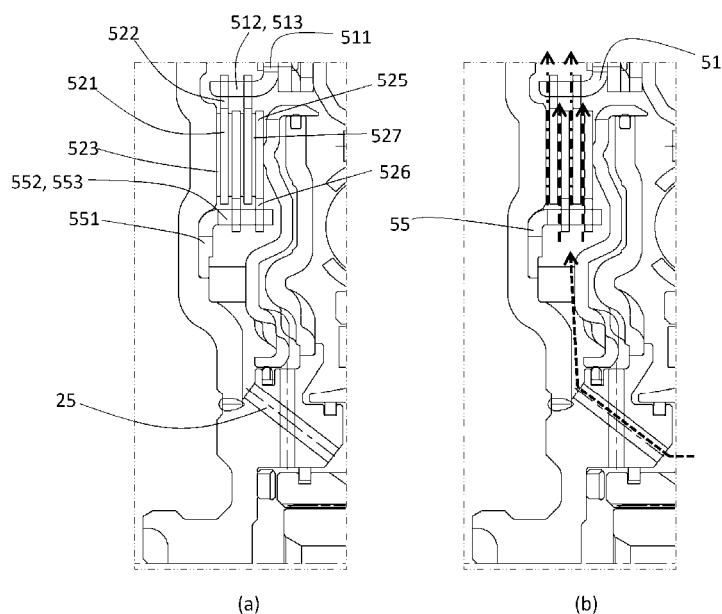
FIG. 4 is an enlarged view of a part of a lock-up clutch of the torque converter in FIG. 3.

With reference to FIGS. 3 and 4, the torque converter 10 may include an input member 20 configured to receive rotational power from an engine, and an output member 60 configured to receive a rotational force of the input member 20. The input member 20 may receive a rotational force of the engine from an axially front side, and the output member 60 may transmit the rotational force axially rearward to a transmission.

The input member 20 may include a front cover 21 configured to receive the rotational power of the engine from the axially front side, and a rear cover 22 coupled to a rear side of the front cover 21. A cover hub 23 may be provided at a central portion of the front cover 21. As illustrated in FIG. 3, the cover hub 23, the front cover 21, and the rear cover 22 may be connected by welding and integrally move. An interior of the cover 20 is filled with a circulating fluid such as transmission oil.

The output member 60 is provided on a central axis of the cover 20 and has a spline hub shape. An input shaft T of the transmission is inserted into and spline-coupled to a hollow portion of the output member 60. A front portion of the output member 60 and a rear portion of the cover hub 23 are supported to be rotatable relative to each other, and a rotational sliding portion is sealed by a seal ring.

The torque converter 10 fluid-couples the input member 20 and the output member 60 by means of a torus 30 including an impeller 31, a turbine 32, and a reactor 34.

The impeller 31 is installed on an inner wall of a front surface of the rear cover 22. Further, the turbine 32 is disposed forward of the impeller 31 and axially faces the impeller 31. The reactor 34 is installed on a fixed end 36 provided between the rear cover 22 and the output member 60 in the axial direction. The reactor 34 is disposed at a centripetal side in a radial section in which the impeller 31 and the turbine 32 face each other.

The reactor 34 may be connected to the fixed end 36 through a one-way clutch 35 and rotated in a direction identical to the rotation direction of the impeller 31 and the turbine 32, and a rotation of the reactor 34 is restricted in a direction opposite to the rotation direction of the impeller 31 and the turbine 32.

A first bearing B1 is installed between the rear cover 22 and the reactor 34, and a second bearing B2 is installed between the reactor 34 and the output member 60, such that the first and second bearings axially support the relative rotations of the rear cover 22, the reactor 34, and the output member 60.

The lock-up clutch 50 of the torque converter 10 is disposed in parallel with the torus 30 in the power transmission system. A rotational force of the input member 20 may be transmitted to the output member 60 through the cover 20, the fluid coupling of the torus 30, and the turbine plate 33 or transmitted to the output member 60 through the cover 20, a coupling of the lock-up clutch 50, a first torsional damper 401, and a second torsional damper 402.

The lock-up clutch 50 includes an inner carrier 55 fixed to an inner wall of a rear surface of the front cover 21, an outer carrier 51 fixed to the first torsional damper 401, and a clutch pack 52 radially disposed between the inner carrier 55 and the outer carrier 51.

A piston 53 is installed rearward of the clutch pack 52 and configured to press the clutch pack 52 forward or release the clutch pack 52. An inner peripheral surface of the piston 53 is axially slidably installed on an outer peripheral surface of the cover hub 23. A chamber plate 534 is provided rearward of the piston 53. An inner periphery of the chamber plate 534 is integrally fixed to the input member 20, and an outer periphery of the chamber plate 534 slidably supports an inner surface of an outer peripheral side of the piston 53. A space between the chamber plate 534 and the piston 53 is defined as an operation chamber 54. The cover hub 23 has an operation hole 24 through which oil is supplied to the operation chamber 54.

When a pressure in the operation chamber 54 becomes higher than a pressure in an external space of the operation chamber 54 as the oil is supplied to the operation chamber 54, the piston 53 moves forward and presses the clutch pack 52, such that the input member 20 and the output member 60 are coupled by the lock-up clutch 50. When a pressure in the operation chamber 54 becomes lower than a pressure in the external space of the operation chamber 54, the piston 53 is moved rearward by an elastic body 535 interposed between the front cover 21 and the piston 53, such that the axial pressing to the clutch pack 52 is released, and thus the input member 20 and the output member 60 are decoupled from the lock-up clutch 50.

The lock-up clutch 50 is connected to the output member 60 by means of two torsional dampers 40 connected in series. The first torsional damper 401 includes a first damper input member 411 connected to the lock-up clutch 50, and a first damper output member 421 disposed with a first elastic body 431 interposed therebetween in a circumferential direction. The second torsional damper 402 includes a second damper input member 412 connected to the first damper output member 421, and a second damper output member 422 disposed with a second elastic body 432 interposed therebetween in the circumferential direction. The second damper output member 422 is connected to the output member 60.

These torsional dampers 401 and 402 mitigate an impact that occurs when the lock-up clutch operates.

A pendulum 45 is installed at a centrifugal end of the second damper output member 422 and connected to the output member 60. The pendulum 45 smooths out fluctuation of a rotational force of the engine to be transmitted to the output member 60.

Transmission oil, which circulates to cool the fluid coupling of the torus 30 and the clutch pack 52, is supplied, through the oil hole 67 of the output member 60 and a hub oil hole 25 of the cover hub 23, to a space provided radially inward of the clutch pack 52, i.e., a space in which the clutch pack 52 is provided in the axial direction.

Further, the oil cools the clutch pack 52 while flowing in the centrifugal direction, flows rearward to be used for the fluid coupling, and circulates toward the transmission through the space between the rear cover 22 and the reactor 34.

Hereinafter, a structure of the lock-up clutch 50 will be specifically described with reference to FIGS. 3 to 19.

The inner carrier 55 includes a second annular member 551 having a small diameter, and second axial keys 552 extending axially rearward from an outer peripheral surface of the second annular member 551. The second annular member 551 is fixed to the front cover 21. The second axial keys 552 are provided as a plurality of second axial keys 552 disposed at equal intervals in the circumferential direction of the second annular member 551. In the embodiment, an example will be described in which eighteen second axial keys 552 are disposed at equal intervals.

A space between the second axial keys 552, which are adjacent to each other in the circumferential direction, may be defined as a second key groove 553. The second key groove 553 is closed in the forward and circumferential directions and opened in the rearward, centripetal, and centrifugal directions. In a second key groove axial section G2 in which the second key groove 553 extends in the axial direction, the second key groove 553 is opened in the two radial opposite directions, and a rotation of a centripetal key 526 is restricted by the second axial key 552.

The outer carrier 51 includes a first annular member 511 having a large diameter, and first axial keys 512 extending axially forward from an inner peripheral surface of the first annular member 511. The first annular member 511 is fixed to a front surface of the torsional damper 40. The first axial keys 512 are provided as a plurality of first axial keys 512 disposed at equal intervals in the circumferential direction of the first annular member 511. In the embodiment, an example will be described in which twenty-four first axial keys 512 are disposed at equal intervals.

A space between the first axial keys 512, which are adjacent to each other in the circumferential direction, may be defined as a first key groove 513. The first key groove 513 is closed in the rearward and circumferential directions and opened in the forward, centripetal, and centrifugal directions. In a first key groove axial section G1 in which the first key groove 513 extends in the axial direction, the first key groove 513 is opened in the two radial opposite directions, and a rotation of a centrifugal key 522 is restricted by the first axial key 512.

The clutch pack 52 includes first friction plates 521 connected to the outer carrier 51 so that rotations thereof are restricted, and second friction plates 525 connected to the inner carrier 55 so that rotations thereof are restricted. The first friction plates 521 and the second friction plates 525 may be alternately disposed in the axial direction. In the embodiment, an example will be described in which two first friction plates 521 and two second friction plates 525 are alternately disposed from the front side toward the rear side.

First friction members 523 are installed on a front surface of the first friction plate 521. In addition, second friction members 527 are installed on a front surface of the second friction plate 525. The first friction members 523 generate frictional forces by being in contact with the rear surface of the front cover 21 or the second friction plate 525 positioned forward of the first friction members 523. The second friction members 527 generate frictional forces by being in contact with a rear surface of the first friction plate 521 positioned forward of the second friction members 527. In the embodiment, an example will be described in which twenty-four first friction members 523 and thirty-six second friction members 527 are disposed at equal intervals in the circumferential direction.

A space between the first friction members 523 adjacent to each other in the circumferential direction is defined as a first flow path groove 524, and a space between the second friction members 527 adjacent to each other in the circumferential direction is defined as a second flow path groove 528. The first flow path groove 524 and the second flow path groove 528 extend in the radial direction.

The first friction plate 521 has the centrifugal keys 522 extending straight radially outward from an outer peripheral surface of the first friction plate 521. The centrifugal keys 522 are provided as a plurality of centrifugal keys 522 disposed at equal intervals in the circumferential direction of the first friction plate 521. In the embodiment, an example will be described in which twenty-four centrifugal keys 522 are disposed at equal intervals. The centrifugal key 522 is inserted into and penetrates the first key groove 513 in the centrifugal direction. Forward/rearward sliding motions of the centrifugal keys 522 are guided by the first axial keys 512 that support circumferential side surfaces of the centrifugal keys 522, and circumferential rotations of the centrifugal keys 522 are restricted.

The second friction plate 525 has the centripetal keys 526 extending straight radially inward from an inner peripheral surface of the second friction plate 525. The centripetal keys 526 are provided as a plurality of centripetal keys 526 disposed at equal intervals in the circumferential direction of the second friction plate 525. In the embodiment, an example will be described in which eighteen centripetal keys 526 are disposed at equal intervals. The centripetal key 526 is inserted into and penetrates the second key groove 553 in the centripetal direction. Forward/rearward sliding motions of the centripetal keys 526 are guided by the second axial keys 552 that support circumferential side surfaces of the centripetal keys 526, and circumferential rotations of the centripetal keys 526 are restricted.

In the embodiment, an example will be described in which thirty-six first flow path grooves 524 are provided and twenty-four second flow path grooves 528 are provided. The number of second flow path grooves 528 is twice the number of centripetal keys 526. The number of first flow path grooves 524 is equal to the number of centrifugal keys 522.

Figure 10:
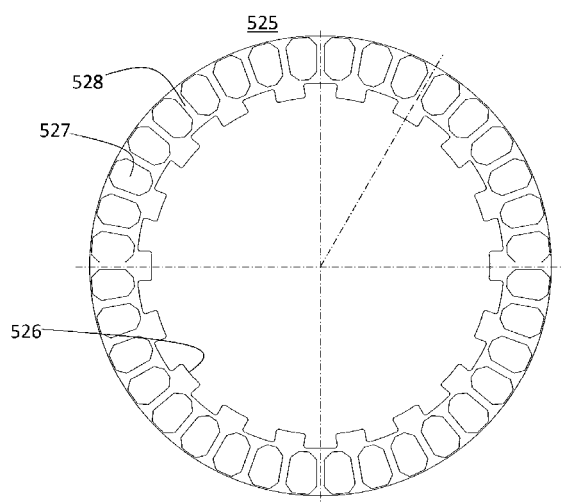
FIG. 10 is a front view of the second friction plate in FIG. 9.
Figure 11:
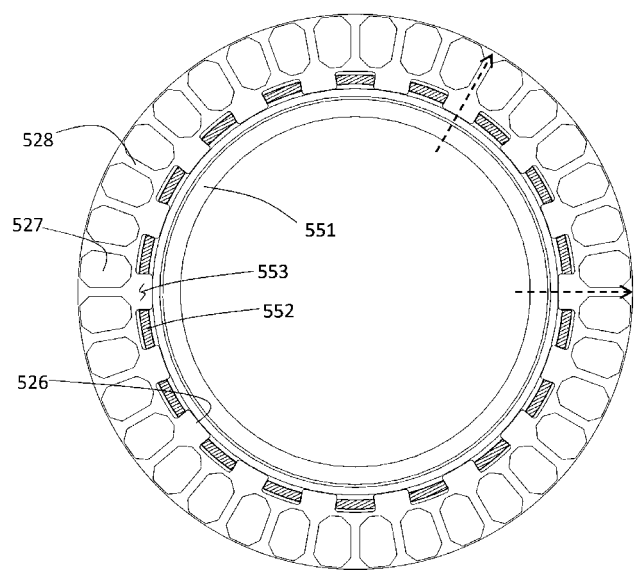
FIG. 11 is a rear view illustrating a state in which the inner carrier and the second friction plate in FIG. 9 are fastened so that rotations thereof are restricted.
Figure 12:
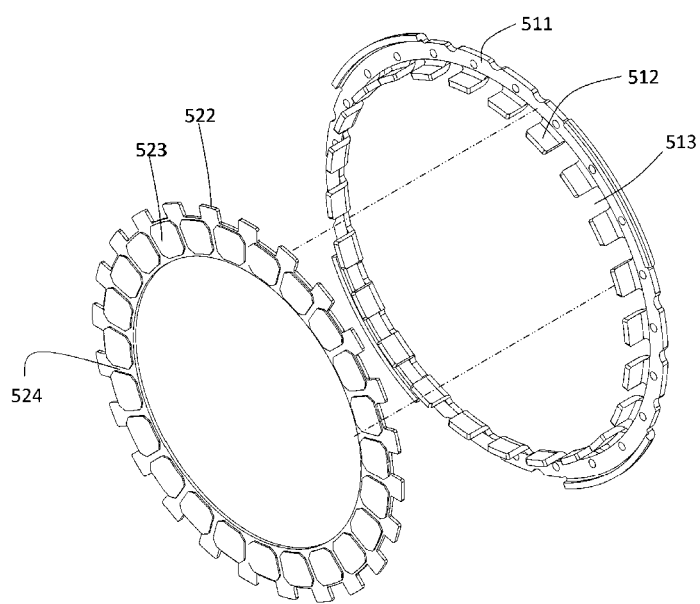
FIG. 12 is an exploded perspective view illustrating an outer carrier and a first friction plate.

With reference to FIGS. 10 and 11, circumferential positions of the centripetal keys 526 are matched with circumferential positions of the second flow path grooves 528 skipped by one. Therefore, the circumferential positions of the second flow path grooves 528, which are skipped by one, are also matched with the second key grooves 553 into which the centripetal keys 526 are fitted.

Figure 13:
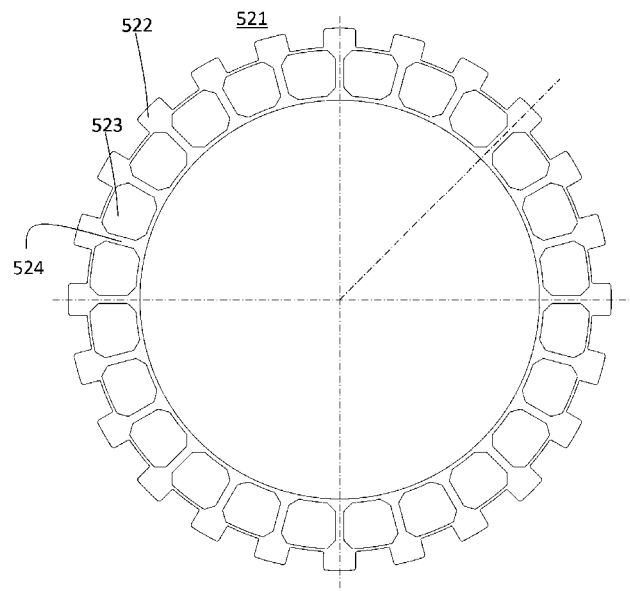
FIG. 13 is a front view of the first friction plate in FIG. 12.
Figure 14:
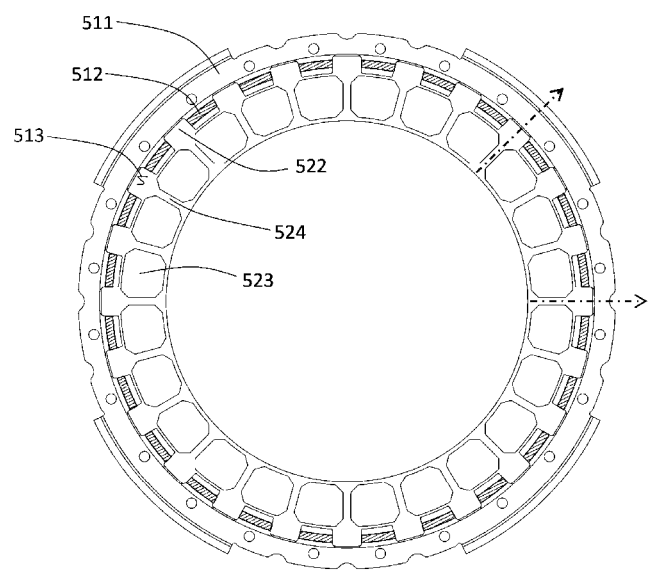
FIG. 14 is a front bottom view illustrating a state in which the outer carrier and the first friction plate in FIG. 12 are fastened so that rotations thereof are restricted.

With reference to FIGS. 13 and 14, circumferential positions of the centrifugal keys 522 are matched with circumferential positions of the first flow path grooves 524. Therefore, the circumferential positions of the first flow path grooves 524 are also matched with the first key grooves 513 into which the centrifugal keys 522 are fitted.

Figure 5:
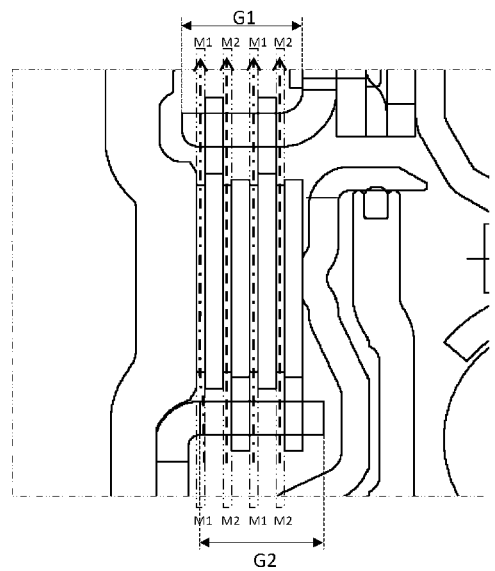
FIGS. 5 and 6 are enlarged views of a part of a clutch pack of the lock-up clutch in FIG. 4.

With reference to FIG. 5, in the clutch pack 52, sections M1, in which the first friction members 523 are disposed in the axial direction, and sections M2, in which the second friction members 527 are disposed in the axial direction, are disposed alternately to be spaced apart from one another in the axial direction. Further, all or at least some of the first friction member axial sections M1 and the second friction member axial sections M2 are disposed in the first key groove axial section G1 and the second key groove axial section G2. In the embodiment, an example will be described in which only the first friction member axial section M1 at a foremost side partially overlaps the second key groove axial section G2 and all the remaining friction member sections M1 and M2 are entirely disposed in the key groove sections G1 and G2.

Then, the oil, which flows in the centrifugal direction by receiving a centrifugal force generated by the rotation of the torque converter 10, smoothly flows while passing through the second key grooves 553 of the inner carrier 55, the first flow path grooves 524 and the second flow path grooves 528 of the clutch pack 52, and the first key grooves 513 of the outer carrier 51.

Figure 6:
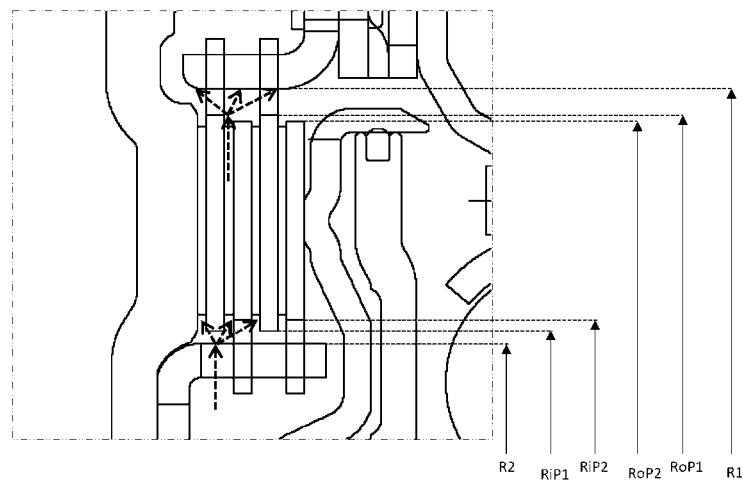
Figure 7:
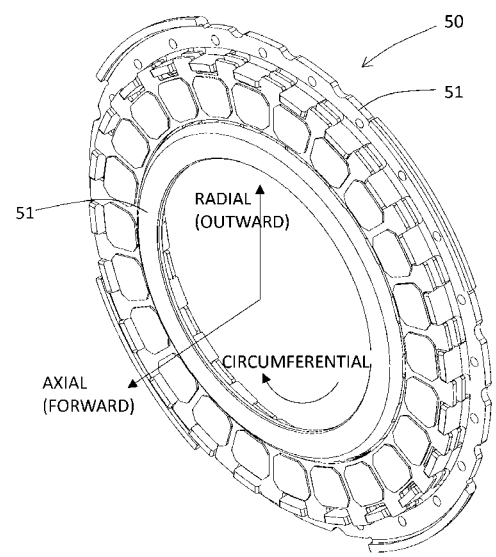
FIGS. 7 and 8 are a perspective view and an exploded perspective view of the lock-up clutch of the torque converter of the second example.
Figure 8:
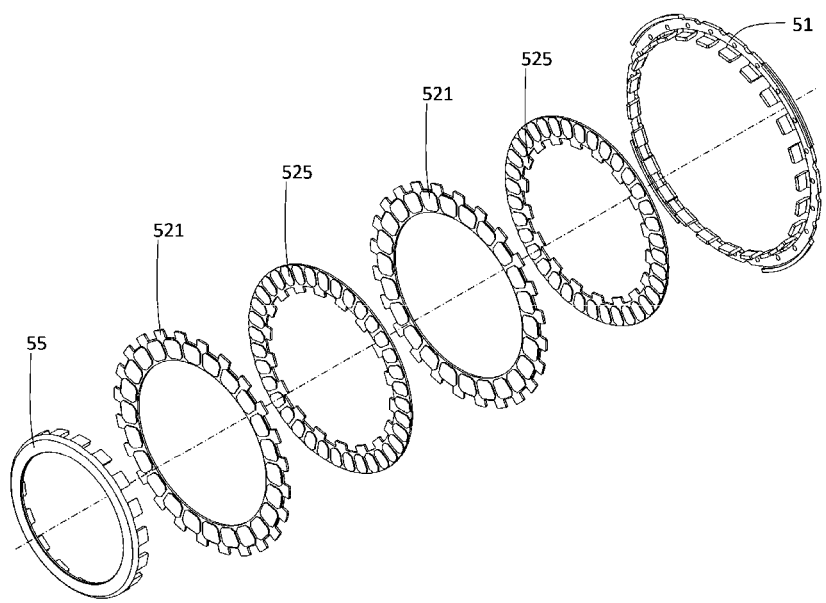
Figure 9:
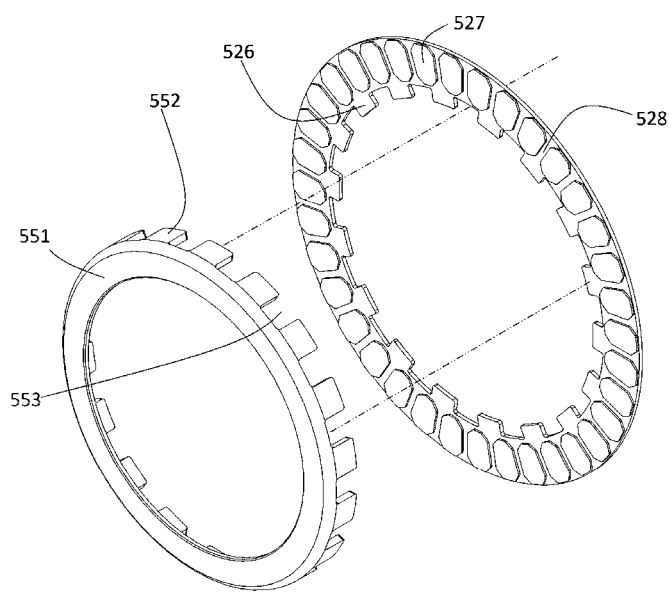
FIG. 9 is an exploded perspective view illustrating an inner carrier and a second friction plate.

With reference to FIG. 6, an inner diameter RiP1 of the first friction plate 521 and an inner diameter RiP2 of the second friction plate 525 are larger than an outer diameter R2 of the second axial key 552, such that predetermined gaps are provided in the radial direction between the second axial keys 552, the first friction plate 521, and the second friction plate 525. Further, an outer diameter RoP1 of the first friction plate 521 and an outer diameter RoP2 of the second friction plate 525 are smaller than an inner diameter R1 of the first axial key 512, such that predetermined gaps are provided in the radial direction between the first friction plate 521, the second friction plate 525, and the second axial keys 552.

Therefore, the fluid, which flows in the centrifugal direction through the second key grooves 553 of the inner carrier 55, is smoothly distributed in the axial direction through the gaps, such that the fluid is introduced into the first flow path grooves 524 and the second flow path grooves 528 of the clutch pack 52. The fluid, which flows in the centrifugal direction through the first flow path grooves 524 and the second flow path grooves 528 of the clutch pack 52, is smoothly distributed in the axial direction through the gaps, such that the fluid is discharged in the centrifugal direction through the first key grooves 513 of the outer carrier 51.

The circumferential positions of the second flow path grooves 528 of the second friction plate 525 with respect to the second key grooves 553 of the inner carrier 55 are not changed even though the inner carrier 55 and the second friction plate 525 are rotated. Likewise, the circumferential positions of the first flow path grooves 524 of the first friction plate 521 with respect to the first key grooves 513 of the outer carrier 51 are not changed even though the outer carrier 51 and the first friction plate 521 are rotated.

Therefore, in the embodiment, when the circumferential positions of the second key grooves 553 and the circumferential positions of the second flow path grooves 528 are aligned and the circumferential positions of the first flow path grooves 524 and the circumferential positions of the first key grooves 513 are aligned, the fluid, which flows in the centrifugal direction through the second key grooves 553, is smoothly introduced into the second flow path groove 528, and the fluid, which flows in the centrifugal direction through the first flow path grooves 524, is smoothly discharged in the centrifugal direction through the first key groove 513.

Meanwhile, a diameter of the torque converter in which the lock-up clutch 50 is installed may be variously set. However, the diameter of the torque converter does not greatly deviate from a typically used diameter range. Therefore, the clutch pack 52, the outer carrier 51, and the inner carrier 55 do not deviate greatly from typically used diameter ranges.

Further, because the first axial key 512 of the outer carrier 51 and the second axial key 552 of the inner carrier 55 are respectively bent axially from the first and second annular members 511 and 551 each having an annular flat plate shape, the first axial key 512 of the outer carrier 51 and the second axial key 552 of the inner carrier 55 may be easily processed, and there are appropriate circumferential dimensions that may withstand rotational forces transmitted in the circumferential direction.

In addition, the first and second friction members 523 and 527 also have appropriate circumferential dimension ranges in terms of design.

Therefore, as described above, a large greatest common divisor is present between the number of second flow path grooves 528 and the number of first key grooves 513 when the second flow path grooves 528 of the second friction plate 525 are disposed at equal intervals in the circumferential direction and the first key grooves 513 of the outer carrier 51 are disposed at equal intervals in the circumferential direction. Likewise, for example, a large greatest common divisor of six or more is present between the number of first flow path grooves 524 and the number of second key grooves 553 when the second key grooves 553 of the inner carrier 55 are disposed at equal intervals in the circumferential direction and the first flow path grooves 524 of the first friction plate 521 are disposed at equal intervals in the circumferential direction.

In the embodiment, the number of second flow path grooves 528 is 36, and the number of first key grooves 513 is 24, such that the greatest common divisor is 12. The number of first flow path grooves 524 is 24, and the number of second key grooves 553 is 18, such that the greatest common divisor is 6.

The outer carrier 51 and the inner carrier 55 may rotate relative to each other. However, during the coupling operation of the lock-up clutch 50, the outer carrier 51 and the inner carrier 55 are integrally rotated as the clutch pack 52 is pressed by the piston 53. Therefore, the circumferential positions of the first flow path grooves 524 of the first friction plate 521 with respect to the second key grooves 553 of the inner carrier 55 vary each time the outer carrier 51 and the inner carrier 55 are coupled. Likewise, the circumferential positions of the second flow path grooves 528 of the second friction plate 525 with respect to the first key grooves 513 of the outer carrier 51 also vary each time the outer carrier 51 and the inner carrier 55 are coupled.

Figure 15:
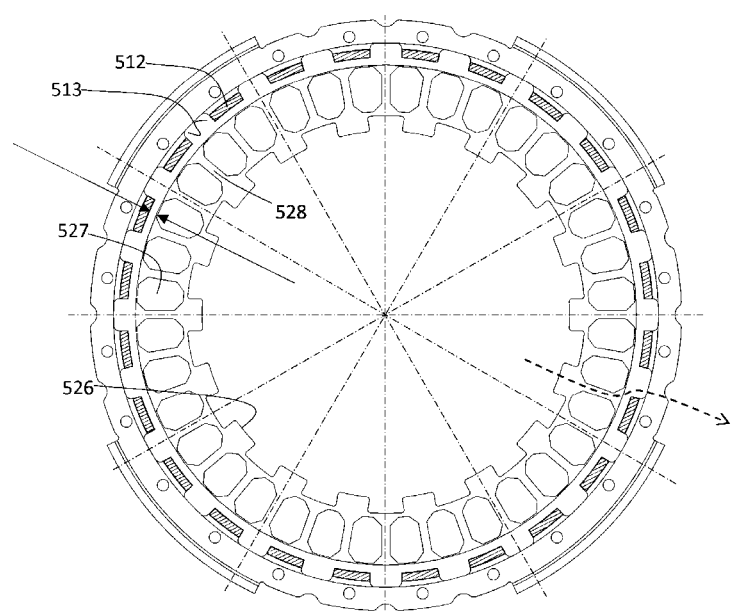
FIG. 15 is a front view illustrating the outer carrier and the second friction plate.
Figure 16:
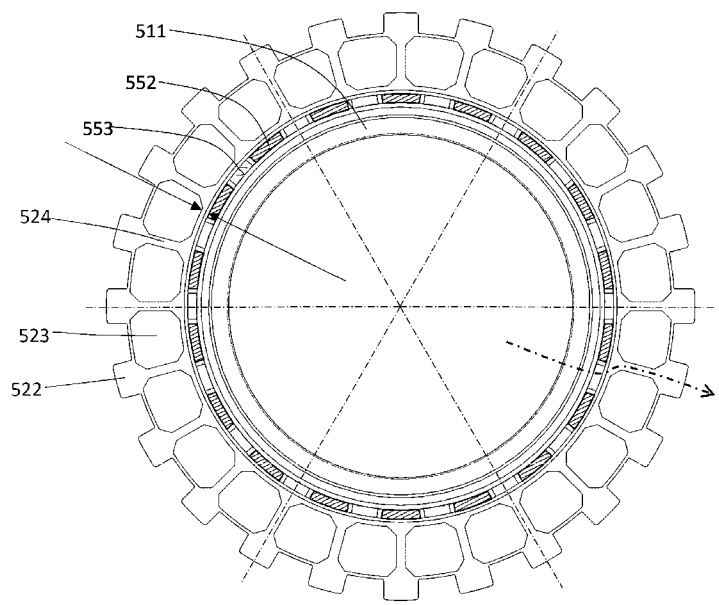
FIG. 16 is a front view illustrating the inner carrier and the first friction plate.
Figure 17:
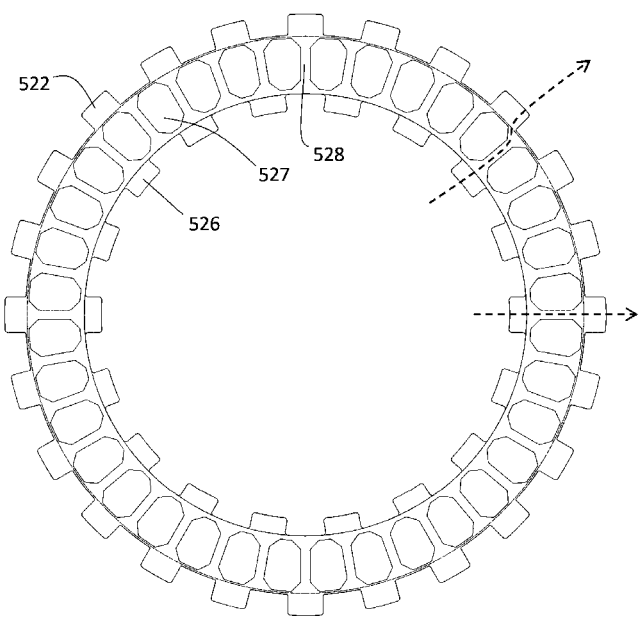
FIGS. 17 to 19 are views illustrating the first and second friction plates aligned in the axial direction when viewed in the axial direction.
Figure 18:
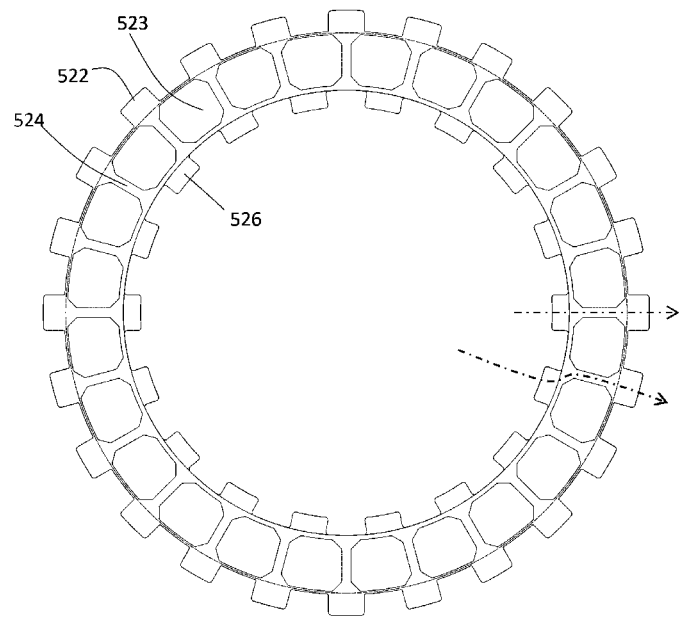
Figure 19:
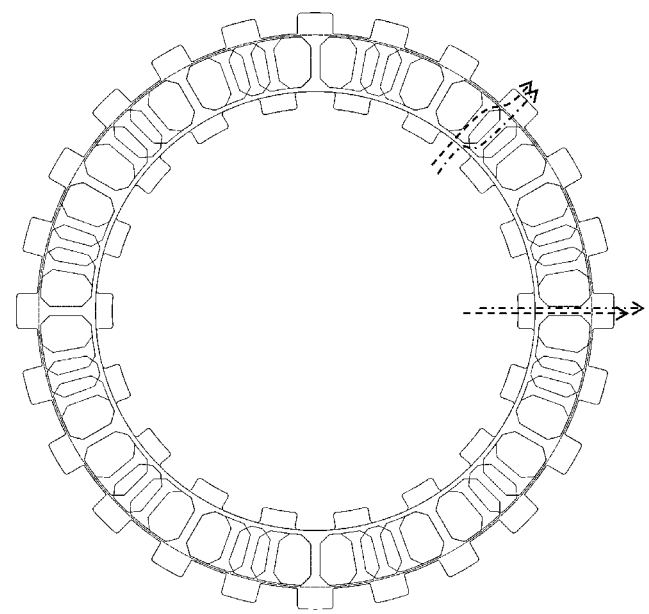

However, even when the outer carrier 51 and the inner carrier 55 are coupled at any position, any one of a plurality of groups grouped by the number of greatest common divisors is aligned. With reference to FIG. 15, the second friction plate 525 may have three groups of second flow path grooves 528 skipped by two, the outer carrier 51 may have two groups of second key grooves 553 skipped by one, and any one of the three groups of second flow path grooves 528 and any one of the two groups of second key grooves 553 may be matched with each other in the radial direction. In addition, with reference to FIG. 16, the first friction plate 521 may have four groups of first flow path grooves 524 skipped by three, the inner carrier 55 may have three groups of second key grooves 553 skipped by two, any one of the four groups of first flow path grooves 524 and any one of the three groups of second key grooves 553 may be matched with each other in the radial direction.

Then, the oil, which flows in the centrifugal direction through the second key grooves 553, more smoothly flows to the first flow path grooves 524 at the six positions uniformly distributed in the circumferential direction, and the oil, which flows in the centrifugal direction through the second flow path grooves 528, more smoothly flows to the first key grooves 513 at the twelve positions uniformly distributed in the circumferential direction. Because differences between flows of oil generated in the circumferential direction are uniformly distributed as described above, a problem such as vibration caused by an imbalanced flow of oil does not occur.

According to the embodiment, a circumferential interval between the second flow path grooves 528 is different from a circumferential interval between the second axial keys 552. The number of second flow path grooves 528 is twice the number of second axial keys 552. Therefore, the circumferential interval between the second axial keys 552 is twice the circumferential interval between the second flow path grooves 528. Therefore, all the second key grooves 553 are aligned with the second flow path grooves 528 in the circumferential direction and face one another in the radial direction.

According to the embodiment, a circumferential interval between the first flow path grooves 524 is equal to a circumferential interval between the first axial keys 512. Therefore, all the first flow path grooves 524 may be matched and aligned with all the first key grooves 513 in a one-to-one manner.

According to the embodiment, all the eighteen centripetal keys 526 respectively face all the second flow path grooves 528 in the radial direction, and all the eighteen second key grooves 553 respectively face all the second flow path grooves 528 in the radial direction.

In addition, according to one embodiment, all the twenty-four first flow path grooves 524 respectively face all the first key grooves 513 in the radial direction and face all the centrifugal keys 522 in the radial direction. Further, all the twenty-four centrifugal keys 522 respectively face all the first flow path grooves 524 in the radial direction, and all the twenty-four first key grooves 513 respectively face all the first flow path grooves 524 in the radial direction.

The circumferential interval between the flow path grooves of the friction plate, the circumferential interval between the keys of the friction plate, and the circumferential interval between the axial keys of the carrier are not limited to the above-mentioned embodiment.

FIGS. 20 to 38 illustrate various different embodiments of the circumferential intervals. The intervals are expressed as straight lines to assist in understanding the present disclosure, but it should be understood that the intervals actually have arc shapes. The circumferential interval between the two adjacent elements in the arc shape may be defined as an included angle between a center of any one element and a center of the other element.

Figure 20:
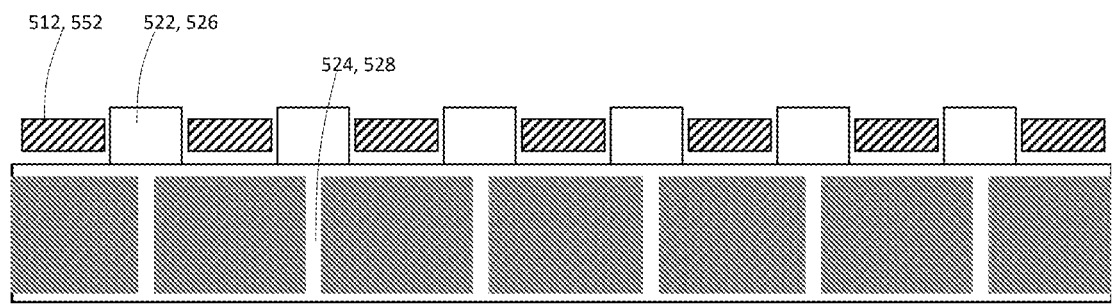
FIGS. 20 to 38 are schematic views illustrating various relationships among numbers and positions of axial keys, key grooves, and flow path grooves.

FIG. 20 illustrates a shape in which the interval between the flow path grooves, the interval between the keys of the friction plate, and the interval between the axial keys of the carrier is 1:1:1.

Figure 21:
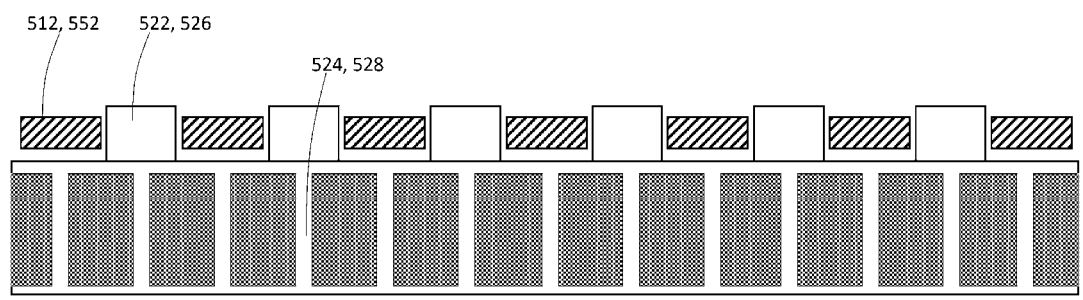

FIG. 21 illustrates a shape in which the interval between the flow path grooves, the interval between the keys of the friction plate, and the interval between the axial keys of the carrier is 1:2:2.

Figure 22:
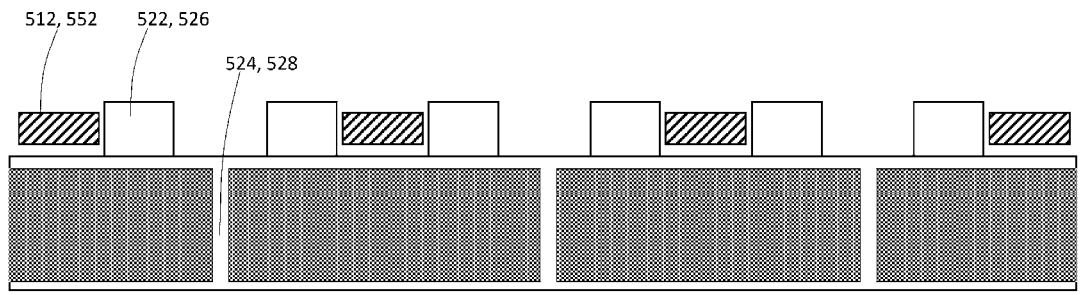
Figure 23:
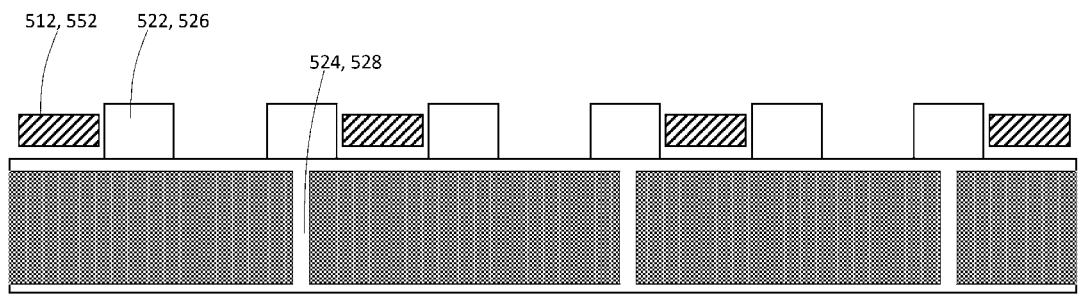

FIGS. 22 and 23 illustrate a shape in which the interval between the flow path grooves, the interval between the keys of the friction plate, and the interval between the axial keys of the carrier is 2:1:2.

Figure 24:
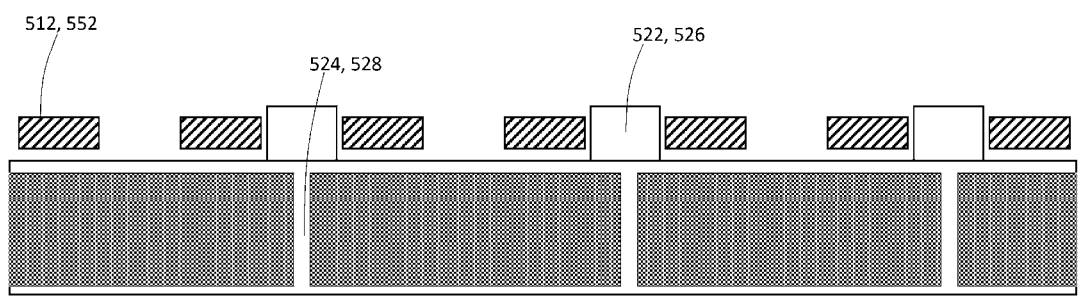
Figure 25:
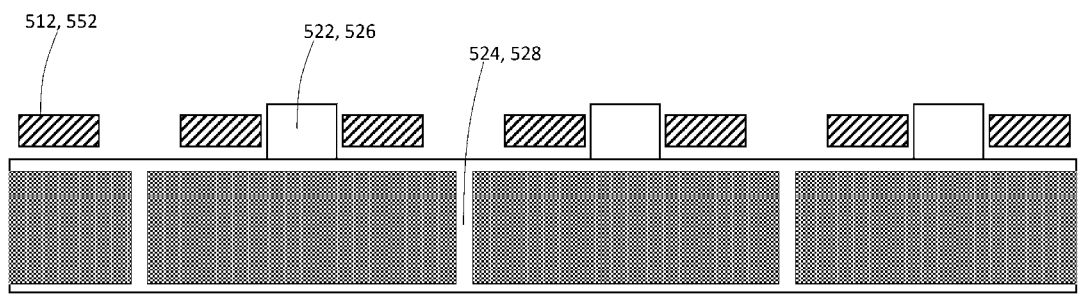

FIGS. 24 and 25 illustrate a shape in which the interval between the flow path grooves, the interval between the keys of the friction plate, and the interval between the axial keys of the carrier is 2:2:1.

Figure 26:
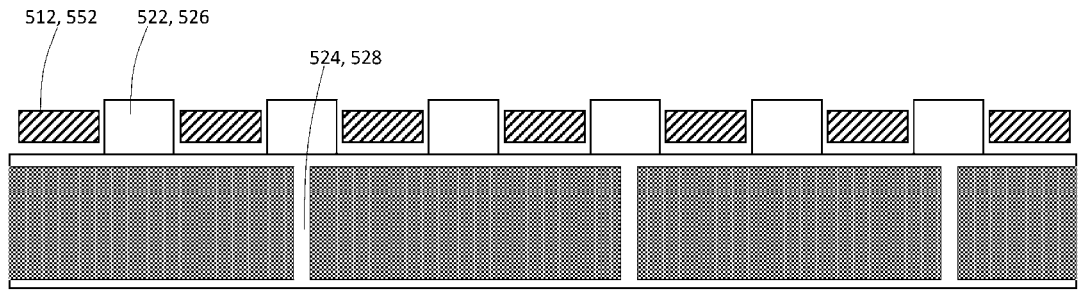

FIG. 26 illustrates a shape in which the interval between the flow path grooves, the interval between the keys of the friction plate, and the interval between the axial keys of the carrier is 2:1:1.

Figure 27:
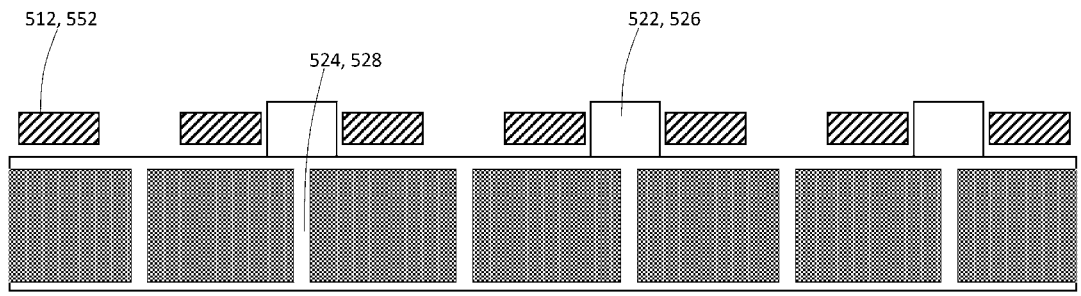
Figure 28:
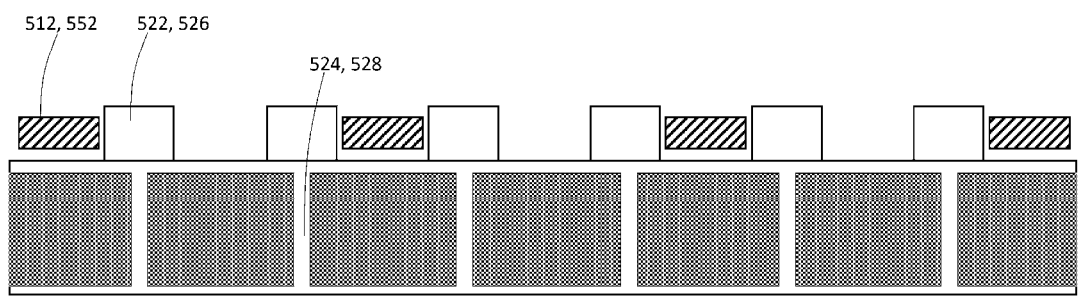

FIGS. 27 and 28 illustrate a shape in which the interval between the flow path grooves, the interval between the keys of the friction plate, and the interval between the axial keys of the carrier is 1:1:2.

Figure 29:
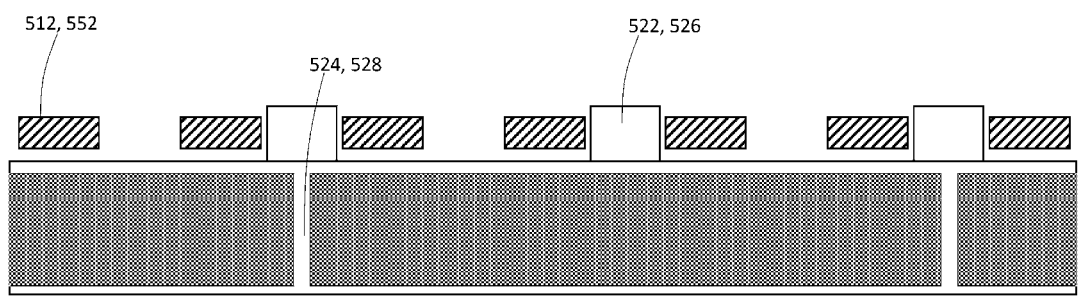
Figure 30:
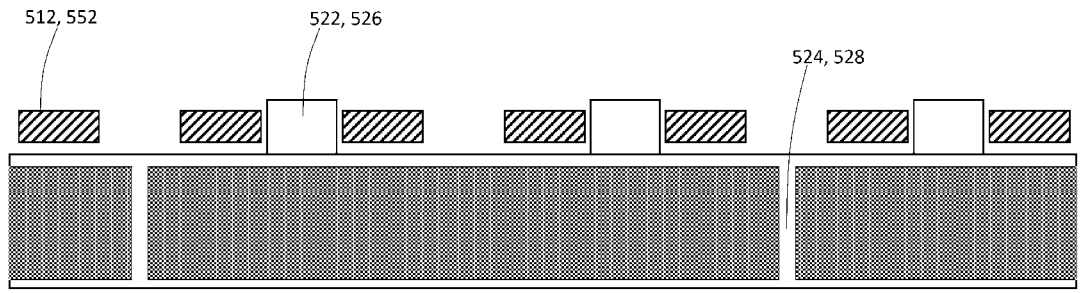

FIGS. 29 and 30 illustrate a shape in which the interval between the flow path grooves, the interval between the keys of the friction plate, and the interval between the axial keys of the carrier is 4:2:1.

Figure 31:
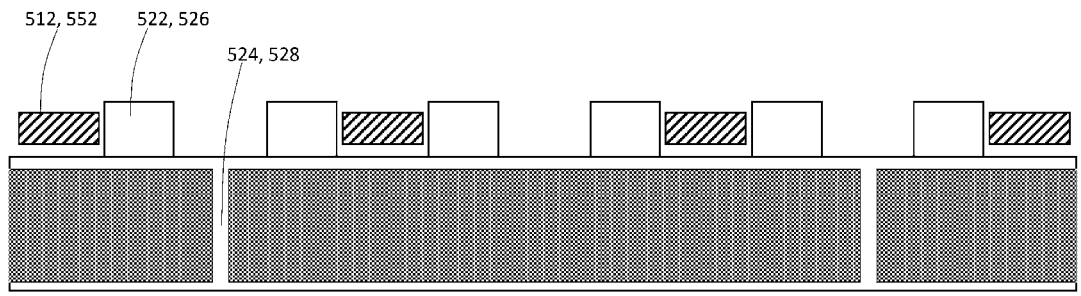
Figure 32:
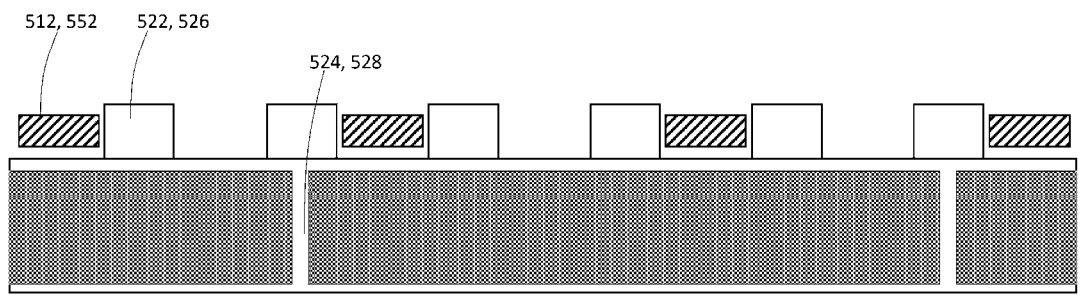

FIGS. 31 and 32 illustrate a shape in which the interval between the flow path grooves, the interval between the keys of the friction plate, and the interval between the axial keys of the carrier is 4:1:2.

Figure 33:
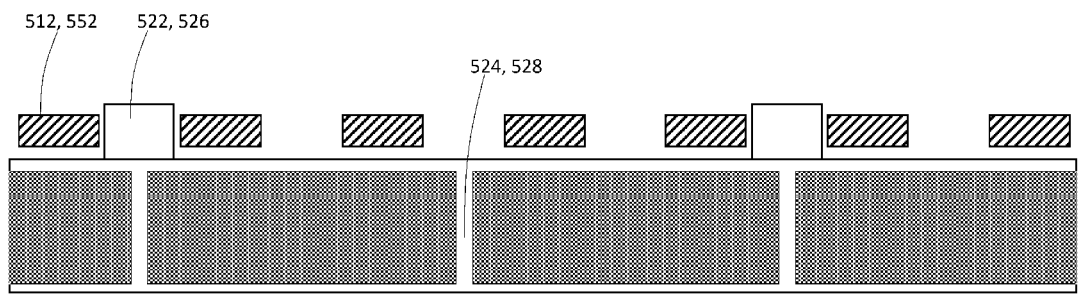
Figure 34:
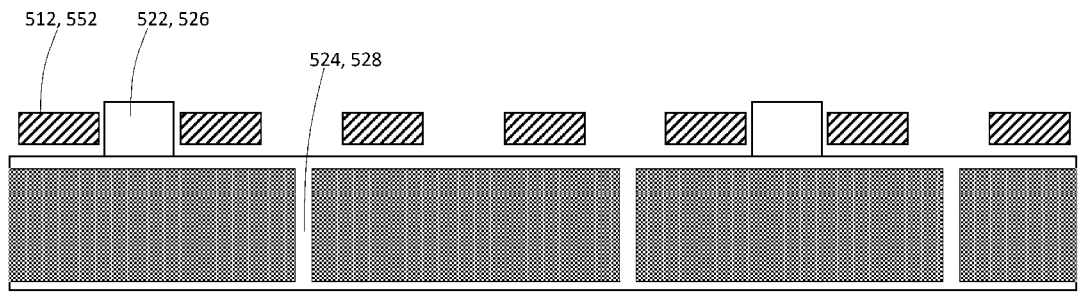

FIGS. 33 and 34 illustrate a shape in which the interval between the flow path grooves, the interval between the keys of the friction plate, and the interval between the axial keys of the carrier is 2:4:1.

Figure 35:
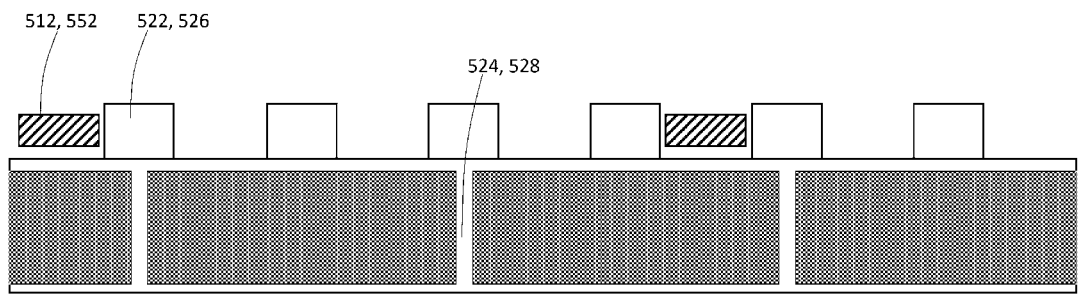
Figure 36:
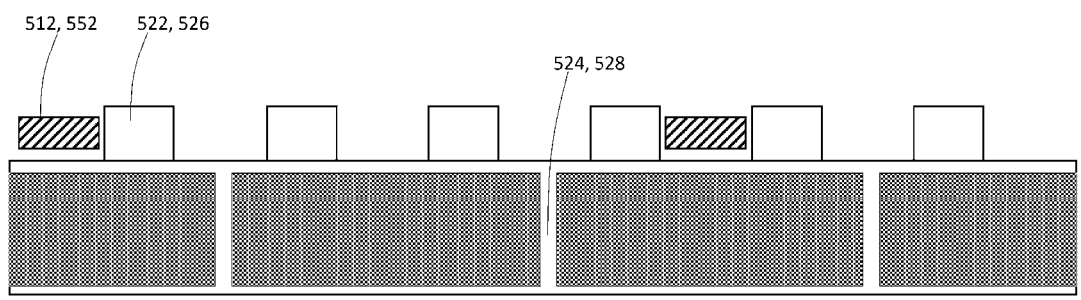

FIGS. 35 and 36 illustrate a shape in which the interval between the flow path grooves, the interval between the keys of the friction plate, and the interval between the axial keys of the carrier is 2:1:4.

Figure 37:
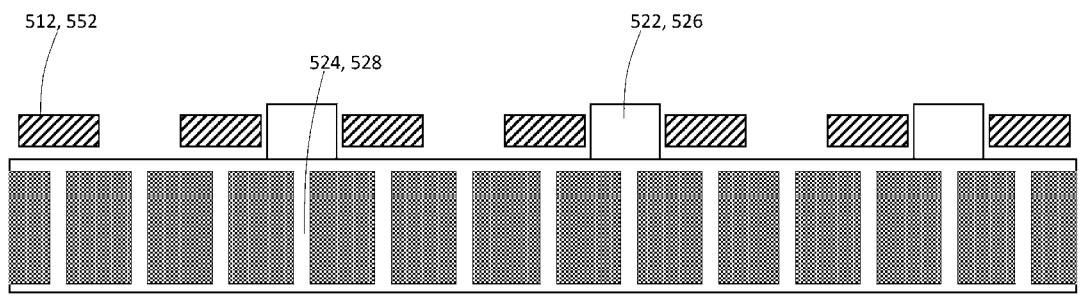

FIG. 37 illustrates a shape in which the interval between the flow path grooves, the interval between the keys of the friction plate, and the interval between the axial keys of the carrier is 1:4:2.

Figure 38:
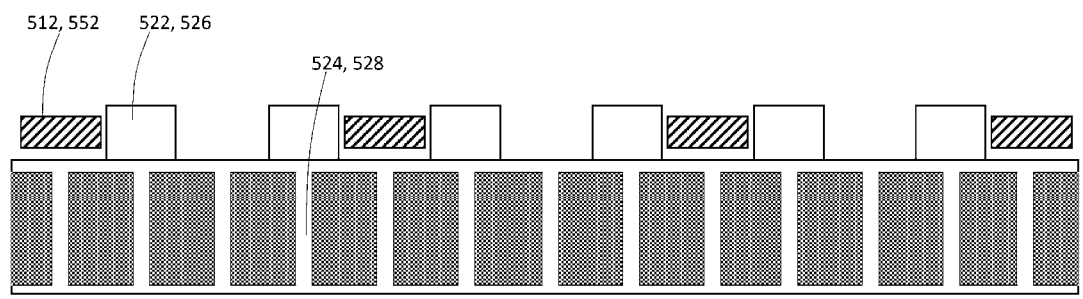

FIG. 38 illustrates a shape in which the interval between the flow path grooves, the interval between the keys of the friction plate, and the interval between the axial keys of the carrier is 1:2:4.

According to the above-mentioned examples, in case that the intervals between the flow path grooves of the outer carrier and the first friction plate are equal to one another, the intervals between the keys of the friction plate are equal to one another, and the intervals between the axial keys of the carrier are equal to one another and in case that the intervals between the flow path grooves of the inner carrier and the second friction plate are equal to one another, the intervals between the keys of the friction plate are equal to one another, and the intervals between the axial keys of the carrier are equal to one another, all the flow path grooves are aligned with the keys of the friction plate, all the flow path grooves are aligned with the key grooves, all the keys of the friction plate are aligned with the flow path grooves, or all the key grooves are aligned with the flow path grooves, such that the oil may more smoothly flow in the centrifugal direction.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

What is claimed is:

1. A lock-up clutch of a torque converter, which transmits a rotational force, which is received from an input member, to an output member, the lock-up clutch comprising:
   an outer carrier connected to any one of the input and output members so that a rotation thereof is restricted;
   an inner carrier connected to the other of the input and output members so that a rotation thereof is restricted, the inner carrier being disposed radially inward of the outer carrier; and
   a clutch pack provided between the outer and inner carriers in a radial direction and including a first friction plate connected to the outer carrier so that a rotation thereof is restricted, and a second friction plate connected to the inner carrier so that a rotation thereof is restricted, the first friction plate and the second friction plate are alternately disposed in an axial direction,
   wherein the outer carrier comprises:
      a plurality of first axial keys disposed to be spaced apart from one another in a circumferential direction and extending in the axial direction; and
      a plurality of first key grooves each provided between the two first axial keys adjacent to each other in the circumferential direction and all opened in centripetal and centrifugal directions,
   wherein the inner carrier comprises:
      a plurality of second axial keys disposed to be spaced apart from one another in the circumferential direction and extending in the axial direction; and
      a plurality of second key grooves each provided between the two second axial keys adjacent to each other in the circumferential direction and all opened in the centripetal and centrifugal directions,
   wherein the first friction plate comprises:
      a plurality of centrifugal keys disposed to be spaced apart from one another in the circumferential direction, extending in the centrifugal direction from an outer peripheral surface of the first friction plate, and inserted into the first key grooves;
      a plurality of first friction members disposed to be spaced apart from one another in the circumferential direction and provided on an axial surface of the first friction plate; and
      a plurality of first flow path grooves each provided between the two first friction members adjacent to each other in the circumferential direction and all opened in the centripetal and centrifugal directions,
   wherein the second friction plate comprises:
      a plurality of centripetal keys disposed to be spaced apart from one another in the circumferential direction, extending in the centripetal direction from an inner peripheral surface of the second friction plate, and inserted into the second key groove;
      a plurality of second friction members disposed to be spaced apart from one another in the circumferential direction and provided on an axial surface of the second friction plate; and
      a plurality of second flow path grooves each provided between the two second friction members adjacent to each other in the circumferential direction and all opened in the centripetal and centrifugal directions,
   wherein the first key grooves are disposed at equal intervals in the circumferential direction, and the second flow path grooves are disposed at equal intervals in the circumferential direction, wherein a number of the first key grooves and a number of the second flow path grooves are different and have greatest common divisor of six or more, wherein the second key grooves are disposed at equal intervals in the circumferential direction, and the first flow path grooves are disposed at equal intervals in the circumferential direction, and wherein a number of the second key grooves and a number of the first flow path grooves are different and have greatest common divisor of six or more.

2. The lock-up clutch of claim 1, wherein all or at least some of sections (M1), in which the first friction members provided on the first friction plate are disposed in the axial direction, and sections (M2), in which the second friction members provided on the second friction plate are disposed in the axial direction, are disposed in a section (G1), in which the first key grooves are disposed in the axial direction, and a section (G2) in which the second key grooves are disposed in the axial direction, respectively.

3. The lock-up clutch of claim 2, wherein an outer diameter of the first friction plate and an outer diameter of the second friction plate are smaller than an inner diameter of the first axial key, and an inner diameter of the first friction plate and an inner diameter of the second friction plate are larger than an outer diameter of the second axial key.

4. The lock-up clutch of claim 1, wherein all the first flow path grooves respectively face the first key grooves in the radial direction.

5. The lock-up clutch of claim 4, wherein the first flow path grooves are disposed at equal intervals in the circumferential direction, the first key grooves are disposed at equal intervals in the circumferential direction, and the centrifugal keys are disposed at equal intervals in the circumferential direction.

6. The lock-up clutch of claim 5, wherein one of two numbers selected among the number of first flow path grooves, the number of first key grooves, and the number of centrifugal keys is always made by multiplying the other of the two numbers by a natural number.

7. The lock-up clutch of claim 1, wherein all the first flow path grooves respectively face the centrifugal keys in the radial direction.

8. The lock-up clutch of claim 1, wherein all the second flow path grooves respectively face the second key grooves in the radial direction.

9. The lock-up clutch of claim 8, wherein the second flow path grooves are disposed at equal intervals in the circumferential direction, the second key grooves are disposed at equal intervals in the circumferential direction, and the centripetal keys are disposed at equal intervals in the circumferential direction.

10. The lock-up clutch of claim 9, wherein one of two numbers selected among the number of second flow path grooves, the number of second key grooves, and the number of centripetal keys is always made by multiplying the other of the two numbers by a natural number.

11. The lock-up clutch of claim 1, wherein all the second flow path grooves respectively face the centripetal keys in the radial direction.

12. A torque converter comprising:
the lock-up clutch of claim 1;
a piston disposed rearward of the clutch pack and configured to press the clutch pack forward; and
a hub oil hole provided in the input member and configured as a passageway through which oil is supplied to a space closer to a centripetal side than the inner carrier, that is, a space disposed forward of the piston,
wherein the inner carrier is connected to a side of the input member, and the outer carrier is connected to a side of the output member.

13. A torque converter comprising:
the lock-up clutch of claim 1;
a piston disposed forward of the clutch pack and configured to press the clutch pack rearward; and
an oil hole provided in the output member and configured as a passageway through which oil is supplied to a space closer to a centripetal side than the inner carrier, that is, a space disposed rearward of the piston,
wherein the outer carrier is connected to a side of the input member, and the inner carrier is connected to a side of the output member.

* * * * *